Patented June 27, 1939

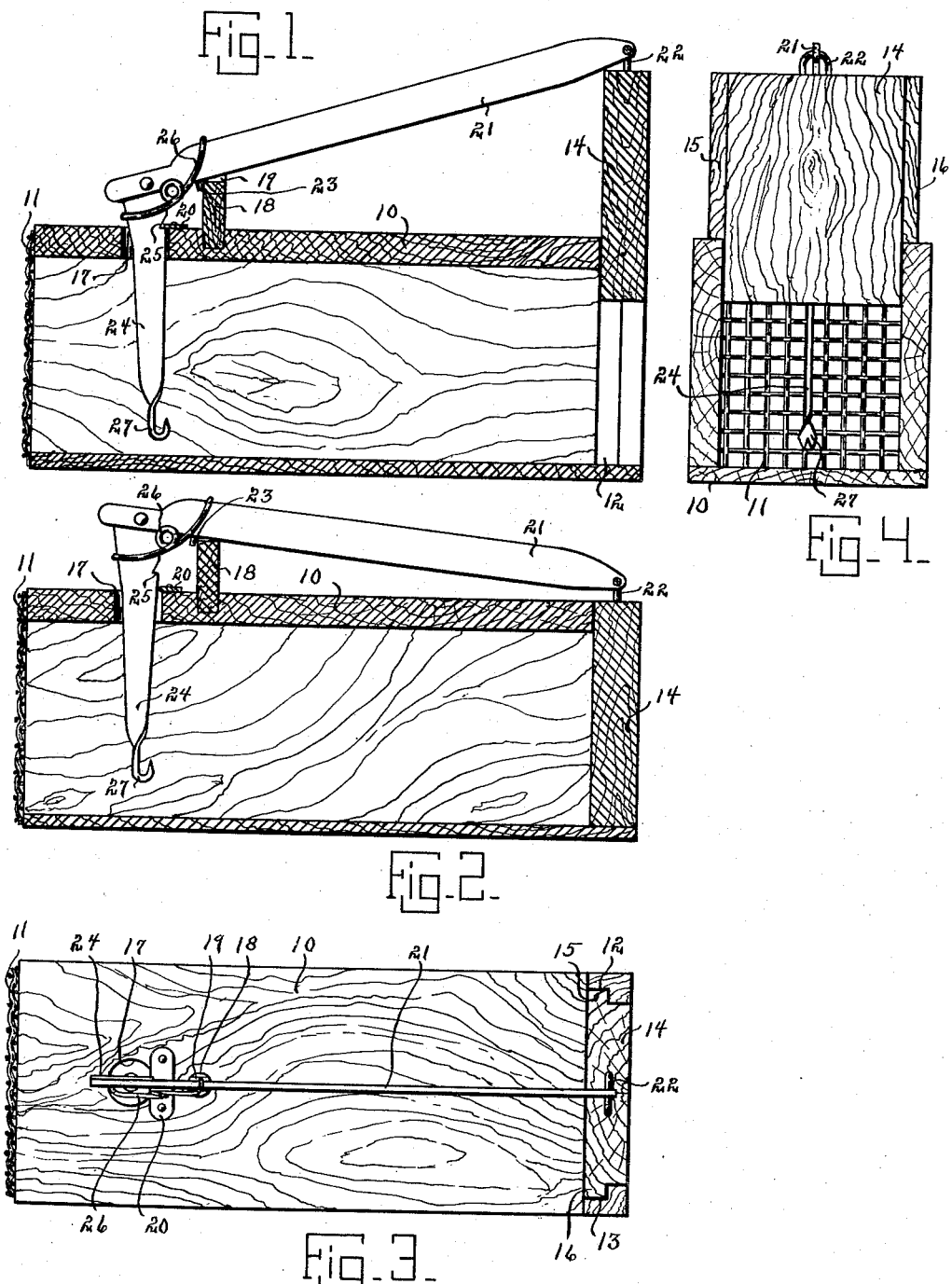

2,163,961

UNITED STATES PATENT OFFICE 2,163,961

MOUSE TRAP

Rex M. Pendry, Hartford, Iowa

Application February 5, 1938, Serial No. 188,865

3 Claims. (Cl. 43—61)

The principal object of this invention is to provide an animal trap that will successfully capture animals such as mice, rats and the like without harming or multilating such animals caught.

A further object of my invention is to provide an animal trap that may be easily and quickly set without damage to the one so setting the trap.

A still further object of this invention is to provide an animal trap that permits the easy release of the animal caught.

A still further object of my invention is to provide an animal trap that may be easily and quickly knocked down for shipping purposes.

A still further object of this invention is to provide an animal trap that is economical in manufacture and durable in use.

These and other objects will be apparent to those skilled in the art.

My invention consists in the construction, arrangement, and combination of the various parts of the device, whereby the objects contemplated are attained as hereinafter more fully set forth, pointed out in my claims, and illustrated in the accompanying drawing, in which:

Fig. 1 is a side sectional view of my trap in open set condition.

Fig. 2 is a side sectional view of the trap in "sprung" condition.

Fig. 3 is a top plan view of my trap and more fully illustrates its construction.

Fig. 4 is the back end view of my trap set and ready for use.

There are many types of traps on the market for catching small animals such as mice and the like, but most of these traps are difficult to set and usually kill the animal, thereby providing undesirable scent or blood on the trap which may make it very inefficient for use the second time.

I have overcome such disadvantages by providing a trap that is easily set, does not harm the animal caught and so constructed as to entice the animal into a position where it may be caught.

Referring to the drawing, I have used the numeral 10 to designate an elongated rectangular housing opened at both ends. The numeral 11 designates a screen secured to and inclosing the front end of said housing. The numerals 12 and 13 designate two vertical grooves in the two side walls of the housing 10 as shown in Fig. 3. These grooves are located near the open rear end of the housing, oppose each other and communicate with the top of the housing 10 as shown in the drawing. The numeral 14 designates a trap door having flanges 15 and 16 normally engaging and sliding in the grooves 12 and 13 respectively. By this arrangement, the trap door 14 may slide upwardly to open the rear end of the housing 10 or it may slide downwardly to close the rear end of the housing 10. The numeral 17 designates a hole in the top of the housing 10. This hole is centrally located and near the forward end of the housing. The numeral 18 designates a post detachably secured in the top of the housing 10 and positioned to the rear of the hole 17. The numeral 18 designates a post detachably secured in the top of the housing 10 and positioned to the rear of the hole 17. The numeral 19 designates a slot in the top of the post 18 extending longitudinally of the lonigtudinal axis of the housing 10. The numeral 20 designates a plate element secured by suitable means to the top of the housing 10. This plate is forward of the post and slightly overlaps the rear end portion of the hole 17. The numeral 21 designates a bar having its rear end loosely connected to the center top of the trap door 14 by staple, ring or like 22. This bar 21 extends forwardly above the housing and has its lower marginal edge engaging and resting in the slot 19 of the post 18. The numeral 23 designates a lug formed on the lower forward end portion of the bar 21 and engaging the forward side of the post 18 for preventing the undesirable rear sliding movement of the bar 21 relative to the post 18. The numeral 24 designates a trigger finger having its upper end pivoted to the forward end of the bar 21 and its length extending downwardly inside the housing through the slot opening 17 as shown in Fig. 1.

The numeral 25 designates a notch on the rear edge of the finger 24 capable of engaging the plate 20. The numeral 26 designates a spring having one end engaging the forward edge of the trigger finger 24 for yieldingly holding the trigger toward the catch plate 20. The numeral 27 designates a bait hook on the lower end of the finger 24.

To set my trap, it is merely necessary to bait the hook 27 and manually force the forward end of the bar 21 downwardly to a point where the spring 26 will move the notch 25 of the trigger finger into engagement with the plate 20. With the notch 25 in engagement with the plate 20, the forward end of the bar 21 will be held downwardly and the rear end of the bar 21 will be held upwardly. As the rear end of the bar 21 is connected to the trap door 14, the trap door will be in an elevated position. Obviously, with the trap door held in an upward position, the animal may pass into the housing 10 through the rear of the housing. When the animal attacks the bait on the hook 27, the trigger 24 will obviously be moved, thereby moving the notch 25 out of engagement with the plate 20 at which time the gravity of the trap door will cause it to fall and the forward end of the bar 21 will be moved to an upward position as shown in Fig. 2. With the trap door in a lowered position, the animal will be trapped within the housing. When the user notes that the trap door is in a lowered position, he may assume that he has trapped a mouse or the like, but he can definitely ascertain this by looking in the housing through the screen in front. To release the animal from the trap, it is merely necessary to raise the trap door. By making my trap of elongated construction, it provides the appearance of a hole, thereby inviting the animal to enter and it is possible to catch animals even when a bait is not used. The screen on the forward end of the housing gives the impression to the animal that the hole is not a dead end. From the foregoing, it will readily be seen that I have provided a highly desirable trap. By not killing the animal in the trap, my trap is not soiled and may be used over and over again without arousing suspicion on the part of the animal to be caught.

In packing for shipment or when not in use, the trap door, bar, trigger finger and spring 26 may be moved upwardly and completely detached from the body of the trap and placed inside the trap with the trap door slid into its receiving groove in an up-side-down position. Also the post 18 may be removed and placed inside the housing.

Although I have described my trap as being particularly desirable for the catching of rats, mice and like, obviously it can be made in suitable sizes for catching various types of animals or birds.

Some changes may be made in the construction and arrangement of my improved mouse trap without departing from the real spirit and purpose of my invention, and it is my intention to cover by my claims any modified forms of structure or use of mechanical equivalents which may be reasonably included within their scope.

I claim:

1. In a trap, a housing having a hole in its top, a trap door slidably mounted on said housing capable of closing said housing when in a lowered position, a post secured to the top of said housing, a bar pivoted between its two ends on said post and having its rear end operatively connected to said trap door, a finger pivoted at its upper end to the forward end of said bar and extending downwardly into said housing through said hole, a notch in said finger, a member rigidly secured to said housing capable of being engaged by said notch, and a means for yieldingly holding said finger toward a direction where said notch will engage said last mentioned member.

2. In a device of the class described, a housing having a hole in its top, a trap door slidably mounted on said housing and capable of closing said housing when in a closed position, a post having a slot in its top secured to said housing, a bar resting in the slot in the top of said post and having one of its ends operatively secured to said trap door, a finger having one of its ends pivotally secured to the other end of said bar and extending downwardly into said housing through said hole, a plate secured to said housing and overlapping a portion of said hole, and a notch in said finger capable of engaging said plate at times.

3. In a device of the class described, a housing having a hole in its top, a trap door slidably mounted on said housing and capable of closing said housing when in a closed position, a post having a slot in its top secured to said housing, a bar resting in the slot in the top of said post and having one of its ends operatively secured to said trap door, a finger having one of its ends pivotally secured to the other end of said bar and extending downwardly into said housing through said hole, a plate secured to said housing and overlapping a portion of said hole, a notch in said finger capable of engaging said plate at times, and a lug on said bar for limiting the sliding movement of said bar relative to said post in one direction.

REX M. PENDRY.